March 17, 1931.   J. W. WYLAND   1,796,699
EGG TESTER
Filed Sept. 7, 1926
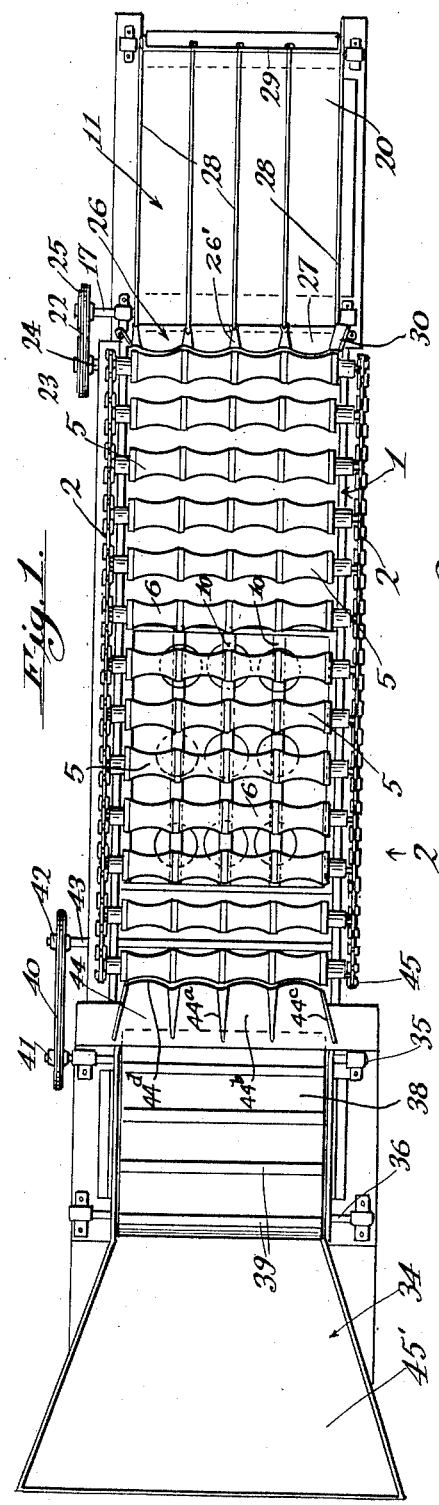
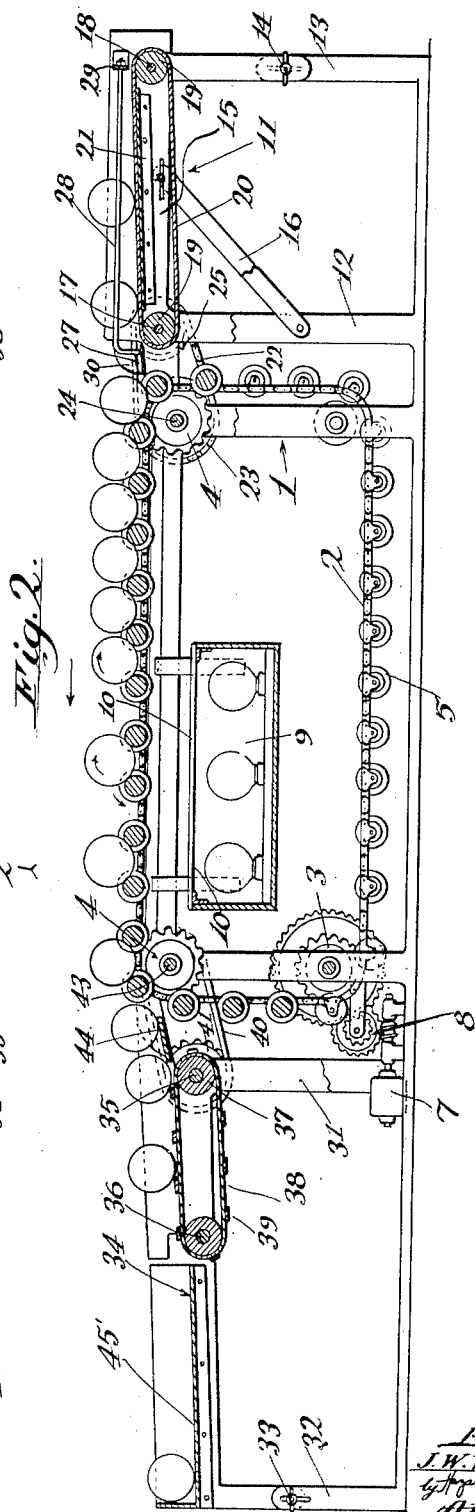
Inventor
J. W. Wyland
by Hogan and Miller
Attorneys Patented Mar. 17, 1931

1,796,699

UNITED STATES PATENT OFFICE

JOHN W. WYLAND, OF SAN GABRIEL, CALIFORNIA

EGG TESTER

Application filed September 7, 1926. Serial No. 133,885.

My invention is an egg tester in which the eggs are conveyed mechanically over a candling device, the eggs being continuously rotated so as to expose each part to such candling arrangement.

The characteristics of this invention comprise the feeding device for loading the eggs on the rotating type of conveyor and also for carrying the eggs off such conveyor, these being arranged to handle eggs evenly and smoothly to prevent breakage.

An object of my invention is to form an organized machine utilizing the egg testing mechanism somewhat as set forth in my patent application, Serial No. 110,072 filed May 19, 1926 for egg testers, which has now matured into Patent No. 1,728,462 of September 17, 1929, with a suitable mechanical mechanism for feeding the eggs on to the rotary type of conveyor of such mechanism, and also to carry the eggs off from such conveyor after they have been candled.

In my construction I have a feeding table with an endless smooth surfaced belt thereon divided longitudinally by partitions. This table and the conveyor are adjustable to vary the inclination of same relative to the carrying rolls for the eggs. The outfeeding conveyor is provided with transverse ribs or slats on an endless belt type of device for conveying the eggs away from the testing machine in order not to break them. This is also adjustable.

My invention is illustrated in the following drawings, in which;

Figure 1 is a plan view of the complete testing machine;

Fig. 2 is an elevation partly broken away, as if taken in the direction of the arrow 2, showing part of the infeeding and outfeeding conveyors in section, and part of the rotary egg testing device in section.

In constructing my invention I utilize a suitable framework designated generally by the numeral 1, having endless chains 2 passing over driven sprocket wheels and idler sprocket wheels 4. These chains have rollers 5 journaled between same, the rollers having a series of grooves 6 or the like so that the grooves of adjacent rollers accommodate the eggs, conforming more or less to the curved shape of the eggs.

The device is driven preferably by an electric motor having a suitable gear train 8 connecting to the sprockets 3. A suitable light box 9 having a series of lamps therein is supported in the frame below the upper reach of the endless chains with rolls thereon in order to cast light upwardly through the eggs. This box is closed on the sides and bottom and fits sufficiently close to the rolls so that but little light may pass upwardly around the eggs. The bars 10 are of sufficient width to prevent the light passing upwardly between the eggs in adjacent grooves.

The feeding table is designated generally by the numeral 11 and has a fixed post 12 and an adjustable post 13 formed in two sections, having clamping screws 14 or the like to adjust the elevation. An upper bar 15 pivotally connected to the top of each of the posts connects same. There is provided an angular brace 16 having a pin and slot connection with the bar 15, these pins preferably having clamp nuts thereon.

Shafts 17 and 18 having rollers 19 thereon are journaled at the upper ends of the posts, preferably at each end of the bars 15 and have an endless belt 20 passing thereover. The upper stretch of this belt is supported by a suitable table top 21. The belt is driven by a sprocket chain 22 passing over a sprocket 23 connected to a shaft 24 of the candling mechanism and operates a sprocket 25 on the shaft 17.

A plate 26 supported at the end of the belt has longitudinal depressions 27 shaped to conform somewhat to that of the eggs. Partition bars 28 secured to the plates 27 and to an abutment rail 29 separate the eggs in the different rows. Side baffles 30 guide the eggs at the side of the machine into the outside grooves in the rotating rollers.

The plate 26 is provided with a series of ridges 26' between the longitudinal depressions 27, and these ridges and depressions, together with the side baffles 30, function to position the eggs with their long axes parallel to the axes of the rollers of the testing machine. In connection with this construction the partition bars 28 maintain the eggs in definite rows. The infeeding conveyor 20 is operated at such a speed relative to the rollers of the egg testing machine that the eggs are forced onto these rollers in the proper position to be carried thereby.

The discharge end of the machine has a frame with a fixed post 31 and an adjustable post 32, this latter having telescopic sections secured by clamp bolts 33. A top framing structure 34 connects the posts having a swivel connection on shaft 35 to allow raising and lowering of the adjustable posts to give the discharge end a greater or lesser inclination.

The shafts 35 and 36 are suitably mounted in the upper frame structure and have rolls 37 thereon over which pass the endless belt of the apron 38 having slats or ribs 39 thereon. This belt is driven by a suitable sprocket or belt drive 40, there being a pulley or sprocket 41 on the shaft 35 and a pulley or sprocket 42 on the shaft 43 carrying the idler sprocket wheel 4 of the egg testing mechanism. A discharge plate 44 is secured to the frame of the discharge end, this having a series of longitudinal shallow grooves to conform to the shape of the eggs and to fit closely adjacent the rollers 5 as these discharge the eggs. A suitable tray 45' which may be padded is positioned adjacent the discharge end of the outfeeding conveyor to receive the eggs which have passed the testing machine and have been subject to candling. It will be understood that the eggs which do not come up to grade are removed while the eggs are over the lamps.

The discharge plate 44 has a series of ridges 44a with depressions 44b between the ridges, and with a side rim 44c. A leading edge 44d is shaped to conform to the shape of the rollers of the testing machine so that eggs as received in rows from the egg testing machine are maintained in such rows and rolled onto the endless belt 38 which has the cross slats 39. These slats prevent the eggs from rolling at too great a speed onto the tray 45'.

From the above construction it will be seen that I have developed an adjustable infeeding conveyor for eggs which may be accurately fitted to the egg candling mechanism and transmit eggs from the feeding device without allowing these to have any substantial drop, thus preventing breakage. Also at the discharge end of the machine the discharge conveyor may be adjusted in elevation so that the eggs roll off the rotating rollers without having sufficient drop to break the eggs. The cross slats on the discharge endless belt prevent the eggs from rolling downwardly into the tray 45 at too great a speed. Such cross slats also operate to push the eggs onto the tray 45 to fill same or keep the tray supplied with eggs while they are packed in cases.

It will be noted in the egg testing part of my machine that the top of the framework 1 is constructed of smooth surface rails on which rotate the cylindrical end portions of the rollers 5, the ends of these rollers being journaled by pins in the endless chains 2 on opposite sides of the structure, these chains being driven by sprockets. This construction allows slippage of one or more of the rollers should an operator wish to hold them stationary to inspect eggs in a stationary position, or if the eggs become jammed so that they might become broken in the testing procedure.

Although I have illustrated my invention of this application in regard to the feeding conveyors as being applied to an egg testing machine as set forth in my prior application, it is to be understood that same may be utilized in connection with other types of egg handling machines. Moreover, that the type of feeding mechanism and conveyor for eggs as used in the testing machine could be used for other purposes than for testing eggs.

In order to effect various changes it may be necessary to change the general details and specific features of my invention to adapt same to different purposes. Such changes would be within the spirit of my invention as set forth in the description, drawings and claims.

Having described my invention, what I claim is:

1. In the art described, the combination of an egg testing machine having a conveyor formed of a series of longitudinally traveling and rotating rollers, an infeeding table having an endless belt conveyor, a plate between the infeeding table and the egg testing machine, said plate being shaped with ridges and baffles in co-operation with the rollers of the infeeding table to position eggs with their long axes transverse to the testing machine, and means to receive eggs at the discharge end of the testing machine.

2. In the art described, the combination of an egg testing machine having a conveyor formed of a series of longitudinally traveling and rotating rollers, an infeeding table having an endless belt conveyor, a plate connecting the infeeding table and the egg testing machine, side baffles at the opposite sides of the plate, said plate being shaped with side baffles in connection with the rollers of the testing machine positioning the eggs with their long axes transverse to the movement of the rollers, and means to discharge eggs from the egg testing machine.

3. In the art described, the combination of an egg testing machine having a conveyor formed of a series of longitudinally traveling and rotating rollers, an infeeding table having an endless belt conveyor, a plate connecting the infeeding table and the egg testing machine, side baffles and intermediate ridges at the sides of the plate, partition bars extending from the plate longitudinally of the infeeding table and above such table, the plate and the side baffles being shaped to position eggs with their long axes transverse to the direction of movement of the rollers, and means to discharge eggs at the outfeeding end of the testing machine.

4. In the art described, the combination of an egg testing machine having a conveyor formed of a plurality of longitudinally traveling and rotating rollers, adjacent rollers having a series of concave surfaces to support and roll eggs with their long axes parallel to the axes of the rollers, an infeeding means for the eggs to load the testing machine, a discharge conveyor formed of an endless belt having transverse slats, a discharge plate between the discharge end of the machine and the discharge conveyor, said plate being shaped with longitudinal ridges and marginal rims with depressions therebetween to receive eggs with their long axes transverse to the plate, said discharge plate forming a slope downwardly for rolling the eggs in a continuity of movement from the testing machine.

5. In the art described, the combination of an egg testing machine having a conveyor with longitudinally traveling and rotating rollers to transport and rotate eggs, an infeeding table having a traveling endless apron, a plate connecting between the apron and the loading end of the machine, side baffles and intermediate ridges at the side of the plate, said plate being shaped to position eggs with their longitudinal axes parallel to the axes of the rollers, an outfeeding conveyor having a traveling endless belt with transverse slats thereon, and a discharge plate connecting from the discharge end of the machine to the said belt, the discharge plate having ridges, marginal rims and longitudinal depressions to separate eggs carried in different rows by the rollers, said discharge plate forming a slope downwardly for rolling the eggs in a continuity of movement from the testing machine.

6. In the art described, the combination of an egg testing machine having a frame with a pair of smooth surface tracks, an endless conveyor having rollers with cylindrical ends rolling on the tracks, the ends of the rollers being journaled in a pair of endless chains with means to drive the chains, the rollers having concave surfaces thereon to engage eggs, means to illuminate the eggs, an infeeding table having an endless belt conveyor with longitudinal partition bars, a plate between the infeeding table and the testing machine, and side baffles at opposite sides of the plate, said plate being shaped with the side baffles and in connection with the shape of the rollers, to position eggs with their long axes parallel to the rollers.

7. In the art described, the combination of an egg testing machine having a frame with a pair of smooth surface tracks, an endless conveyor having rollers with cylindrical ends rolling on the tracks, the ends of the rollers being journaled in a pair of endless chains with means to drive the chains, the rollers having concave surfaces thereon to engage eggs, means to illuminate the eggs, an infeeding table having an endless belt conveyor with longitudinal partition bars, a plate between the infeeding table and the testing machine, side baffles at opposite sides of the plate, said plate being shaped with the side baffles and in connection with the shape of the rollers, to position eggs with their long axes parallel to the rollers, a discharge conveyor formed of an endless belt, and a discharge plate between the discharge end of the testing machine and the conveyor, said plate being shaped to receive eggs and support same with their long axes parallel to the rollers.

In testimony whereof I have signed my name to this specification.

J. W. WYLAND.